(12) United States Patent
Rhodes

(10) Patent No.: US 6,360,773 B1
(45) Date of Patent: Mar. 26, 2002

(54) METHODS FOR MONITORING WEAR IN SEAT MATERIALS OF VALVES

(75) Inventor: Michael L. Rhodes, Richfield, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/579,093

(22) Filed: May 25, 2000

Related U.S. Application Data

(60) Provisional application No. 60/140,086, filed on Jun. 21, 1999.

(51) Int. Cl.[7] .............................................. F16R 37/00
(52) U.S. Cl. .......................... 137/554; 137/559; 73/168
(58) Field of Search .............................. 137/551, 554, 137/559; 251/359; 73/168

(56) References Cited

U.S. PATENT DOCUMENTS

| | | | | |
|---|---|---|---|---|
| 3,950,985 A | * | 4/1976 | Buchwald et al. ............. 73/116 |
| 4,129,037 A | * | 12/1978 | Toalson ................... 73/152.61 |
| 4,461,316 A | * | 7/1984 | Cove et al. ................. 137/312 |
| 4,481,805 A | | 11/1984 | Dobesh |
| 4,505,243 A | | 3/1985 | Miwa |
| 4,690,373 A | | 9/1987 | Linder et al. |
| 4,735,229 A | * | 4/1988 | Lancaster ................... 137/375 |
| 4,874,007 A | * | 10/1989 | Taylor ........................ 137/312 |
| 5,086,273 A | * | 2/1992 | Leon ...................... 137/554 X |
| 5,154,080 A | * | 10/1992 | Hill et al. ............... 137/554 X |
| 5,280,773 A | | 1/1994 | Henkel |
| 5,329,465 A | * | 7/1994 | Arcella et al. .......... 137/554 X |
| 5,524,484 A | * | 6/1996 | Sullivan ...................... 73/168 |
| 5,704,586 A | * | 1/1998 | Nielsen ................... 137/554 X |
| 5,879,060 A | | 3/1999 | Megerle et al. |

FOREIGN PATENT DOCUMENTS

EP       0933571 A       8/1999

OTHER PUBLICATIONS

Patent Abstracts of Japan, vol. 1998, No. 12, Oct. 31, 1998 & jp 10 196550 A (Honda Motor Co Ltd), Jul. 31, 1998 Abstract.

* cited by examiner

*Primary Examiner*—John Rivell
(74) *Attorney, Agent, or Firm*—John G. Shudy, Jr.

(57) ABSTRACT

Systems and methods are discussed that monitor wear in seat materials of a valve. One aspect of the present invention includes a system. The system includes sensors to sense the open/closed status of the valve within a desired range. The system also includes a set of counters to count each time the desired range is adjusted to characterize the valve as having the open/closed status if the valve was not within the desired range. The count of each counter is indicative of wear in seat materials of the valve. Another aspect of the present invention includes a method. The method includes determining an open/closed status of the valve within a desired range, and adjusting adaptively the desired range so as to characterize the valve as having the open/closed status if the valve was not within the desired range. Each iteration of adjusting is indicative of wear in seat materials of the valve.

58 Claims, 10 Drawing Sheets

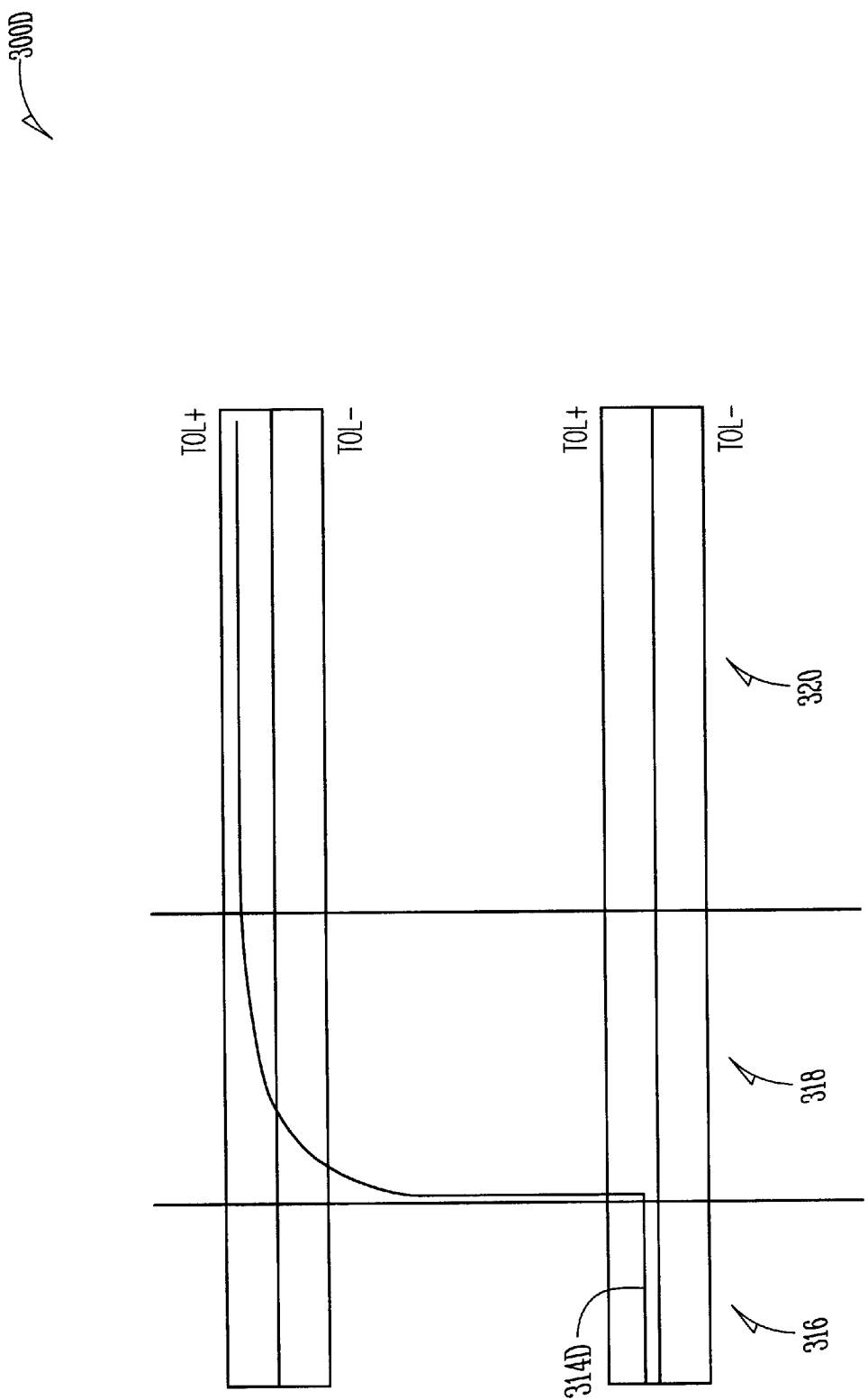

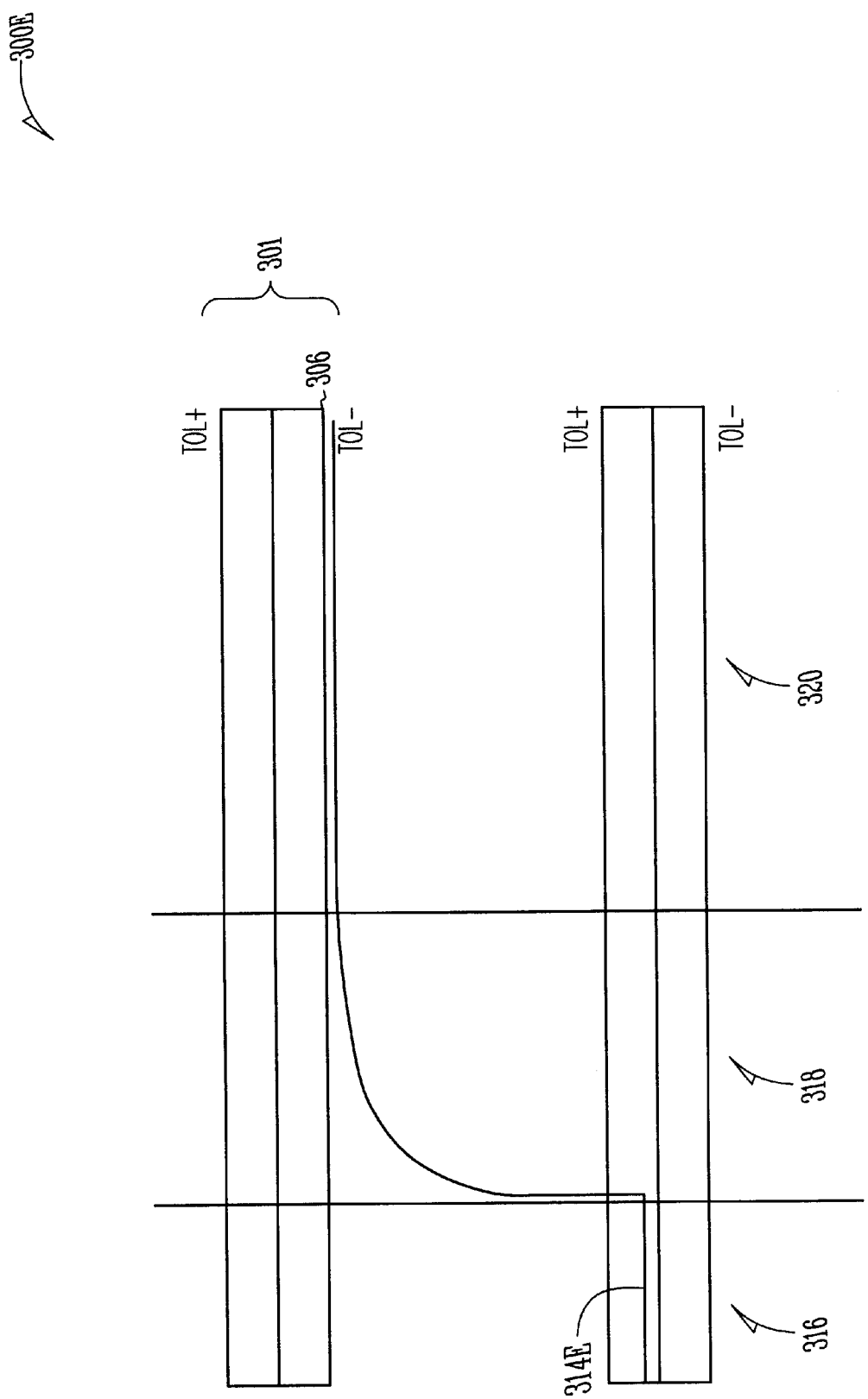

METHODS FOR MONITORING WEAR IN SEAT MATERIALS OF VALVES

PRIORITY

This application claims the benefit under 35 U.S.C. §119 (e) of U.S. Provisional Application No. 60/140,086 filed on Jun. 21, 1999.

TECHNICAL FIELD

This invention relates generally to monitoring valves, and more particularly to monitoring wear in seat materials of valves.

BACKGROUND

A valve is a mechanical device by which the flow of liquid, gas, or lose material in bulk may be started, stopped, or regulated by opening, shutting, or partially obstructing one or more passageways. To ensure tightness, prevent leakage, or relieve tension in a joint created by the valve and a passageway, a valve is typically fitted with seat materials, such as rubber. With repeated usage, seat materials may be worn away.

One reason seat materials may be worn away is because of the flow of liquid, gas, or lose materials in bulk. Such a flow may be at a velocity that acts like a shearing force upon the seat materials. Although the seat materials may be initially resistant to the shearing force, over time the seat materials may be weakened by the continuous presence of such a force. Another reason for the weakening of the seat materials is due to a compressive force that is provided to create the joint between the valve and the passageway. The seat materials may lose their elasticity with the continuous application of the compressive force, and over time, the seat materials will be worn away also.

Seat materials typically are worn away gradually. Thus, seat materials may continue to support the joint after the seat materials begin to wear. Current techniques, which determine when seat materials should be replaced, require a large buffer to store observations of wear in seat materials over a period of time. Such a period of time may be months or even years. It may be difficult to surmise how large a buffer must be. Current techniques have other drawbacks as well that are inflexible to changes in customers' requirements. This may eventually lead to the lack of acceptance in the marketplace for products using those techniques.

Thus, what is needed are systems and methods to enhance the monitoring of wear in seat materials of valves.

SUMMARY

Systems and methods for monitoring wear in seat materials of valves are discussed. An illustrative aspect includes a system for monitoring wear in seat materials of a valve. The system includes sensors to sense the open/closed status of the valve within a desired range, and a set of counters to count each time the desired range is adjusted to characterize the valve as having the open/closed status if the valve was not within the desired range. The count of a counter is indicative of wear in the seat materials of the valve.

Another illustrative aspect includes a method for monitoring wear in seat materials of a valve. The method includes setting a range of positions indicative of an open/closed status of the valve, and determining the open/closed status of the valve within the range. The method further includes adjusting adaptively the range within a desired limit so as to characterize the valve as having the open/closed status if the valve was not within the range. Each iteration of adjusting is indicative of wear in seat materials of the valve.

Another illustrative aspect includes a method for monitoring wear in seat materials of a valve. The method includes obtaining a position of the valve, processing the position that includes adjusting within a range, and notifying the open/closed status of the valve.

BRIEF DESCRIPTION OF THE DRAWINGS

FIGS. 3A, 3B, 3C, 3D, 3E, and 3F show graphs of statuses of a valve according to one aspect of the present invention.

DETAILED DESCRIPTION

Figure 1:
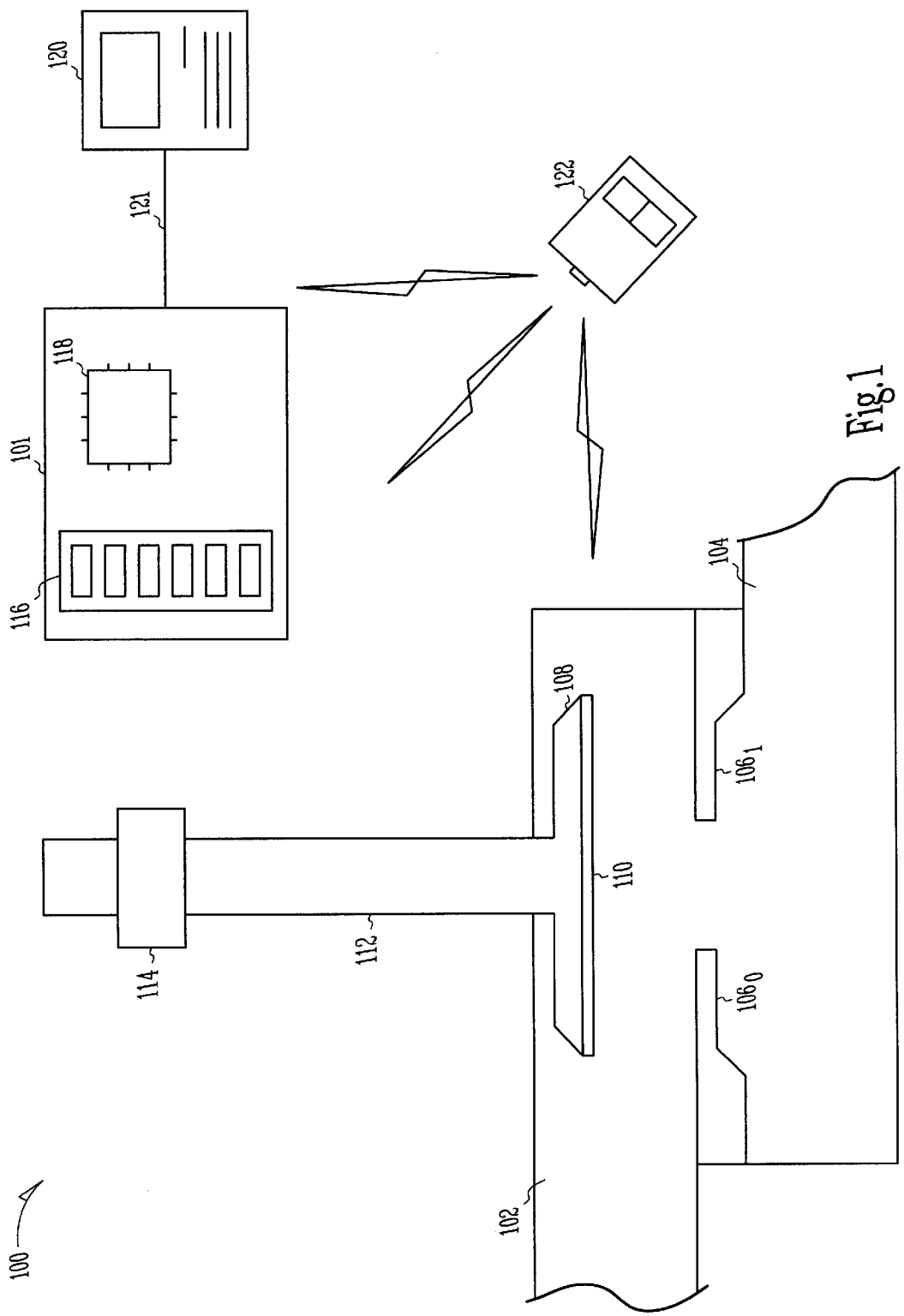
FIG. 1 shows a system according to one aspect of the present invention.

In the following detailed description of exemplary embodiments of the invention, reference is made to the accompanying drawings that form a part hereof, and in which is shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

FIG. 1 shows a system according to one aspect of the present invention. The system 100 includes a passageway 102 and a passageway 104. Liquid, gas, or lose material in bulk may flow through the passageway 102 and the passageway 104 to reach a desired destination. Such a flow can be started, stopped, or regulated by the valve 108. The valve 108 may be engaged with surfaces $106_0$ and $106_1$ to start, stop, or regulate the flow. The valve 108, as illustrated in FIG. 1, can be considered a single-acting valve. To ensure tightness, prevent leakage, or relieve tension in a joint created by the valve 108 and surfaces $106_0$ and $106_1$, a valve is typically fitted with a seat material 110. In one embodiment, the seat material 110 includes rubber.

With repeated usage, seat material 110 may be worn away. As the seat material 110 is worn, the valve 108 settles deeper against the surfaces $106_0$ and $106_1$ during engagement. The embodiments of the present invention monitor such wear in the seat material 110 and adjust adaptively to the wear. Such adjustment will be performed until a point at which the embodiments of the present invention notify the operator to provide maintenance to the valve 108.

The valve 108 is coupled to an actuator 112. The actuator 112 is a mechanical device for moving or controlling the valve 108. The actuator 112 may be used to engage the valve 108 with surfaces $106_0$ and $106_1$.

A magnetic source 114 is coupled to the actuator 112. As the actuator 112 moves longitudinally to control the valve 108, the magnetic source 114 radiates a magnetic field. Such a magnetic field is indicative of a position of the valve 108.

The magnetic field may be sensed by a set of sensors 116 to derive the position of the valve 108. From the position of the valve 108, the open/closed status of the valve 108 can be inferred within a desired range. The desired range includes a nominal position that is used to infer the open/closed status of the valve 108. The desired range also includes a tolerance around the nominal position. The desired range may be adjusted adaptively to account for the wear of the seat material 110. In one embodiment, the desired range is adjusted within a desired limit.

The system 100 includes a microprocessor 118. The microprocessor 118 executes a piece of software (not shown). The piece of software includes a set of counters (not shown). At least one counter of the set of counters counts each time the desired range is adjusted to characterize the valve 108 as either open or closed if the valve was not within the desired range. The count of a counter is indicative of wear in seat material 110. In one embodiment, the set of counters includes a counter for an open position and a counter for a closed position.

The piece of software also includes at least one alert level and at least one alarm level. In one embodiment, the counter for an open position includes an alert level and an alarm level. In another embodiment, the counter for a closed position includes an alert level and an alarm level.

In one embodiment, the piece of software issues an alert signal when the count of a counter reaches the alert level. In another embodiment, the piece of software issues an alarm signal when the count of a counter reaches the alarm level.

The system 100 also includes a setup manager 120. The setup manager 120 may be coupled to the interface board 101 through a serial connection 121. The setup manager 120 manages an alteration in the alert levels and the alarm levels. The setup manager 120 may also selectively lock the alert levels and the alarm levels to inhibit undesired changes to the alert levels and the alarm levels. In one embodiment, the setup manager 120 is a piece of software running on a personal computer. The piece of software includes a graphical user interface that allows the user to change various parameters and execution of the piece of software running on the microprocessor 118.

The system 100 also includes a remote control 122. In one embodiment, the remote control 122 emulates a portion of the functionality of the setup manager 120.

Figure 2:
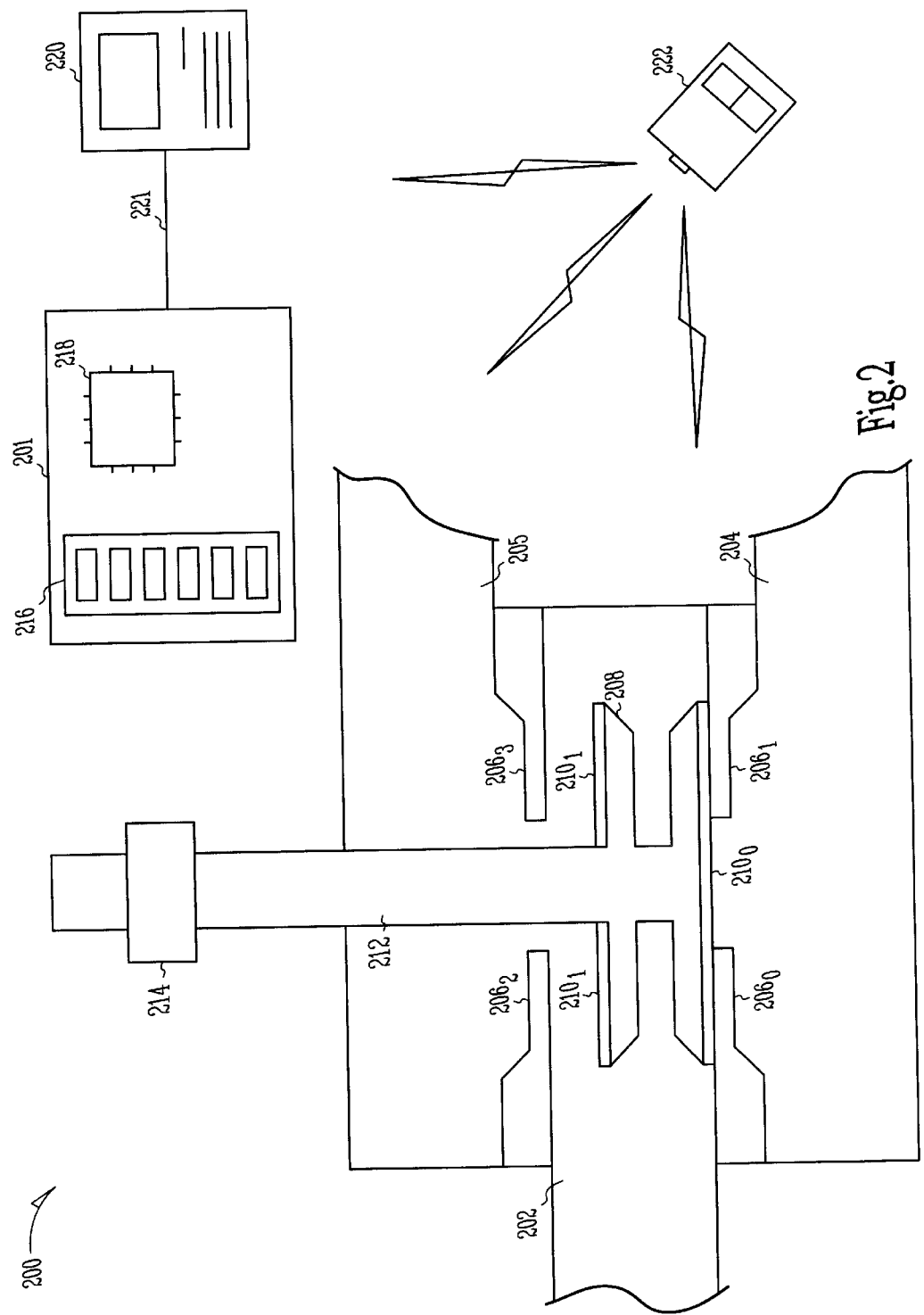
FIG. 2 shows a system according to one aspect of the present invention.

FIG. 2 shows a system according to one aspect of the present invention. FIG. 2 includes elements that are similar to elements discussed in FIG. 1. These elements share identical last-two digits of the numerical nomenclature. Discussion of those elements presented above is incorporated here in full. The system 200 illustrates a valve 208 that acts as a double-acting valve. The valve 208 includes a seat material $210_0$ and a seat material $210_1$. The valve 208 operates to close one passageway while contemporaneously opening another passageway. Suppose the valve 208 closes a passageway 205 by engaging against the surfaces $206_2$ and $206_3$. Contemporaneously, the valve 208 is opened with respect to a passageway 204. Liquid, gas, and loose material in bulk may flow between the passageway 204 and a passageway 202.

The embodiments of the present invention provide for additional desired ranges, counters, alert levels, and alarm levels to support the valve 208 in its operation as a double-acting valve.

Figure 3A:
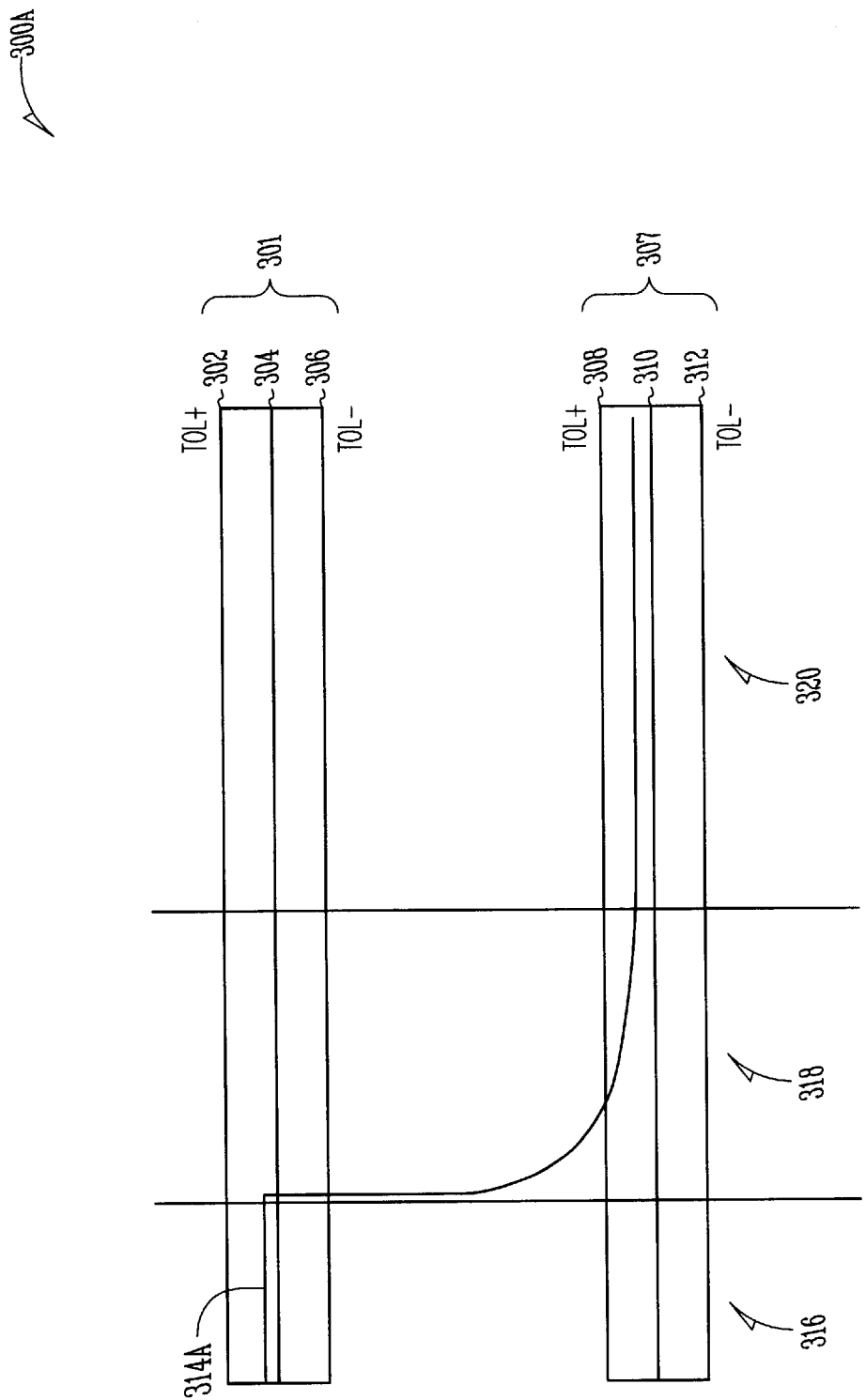

FIGS. 3A, 3B, 3C, 3D, 3E, and 3F show graphs of statuses of a valve according to one aspect of the present invention. FIG. 3A illustrates a normal open/closed sequence of a valve in operation. The graph 300A includes a range 301 of positions. If a position of a valve is within this range 301, the valve may be considered opened or having an open status. The range 301 includes a nominal position 304. The range 301 also includes an upper tolerance 302 and a lower tolerance 306. These tolerances describe positions that a valve may have to still be considered as having an open status.

The graph 300A includes a range 307 of positions. If a position of a valve is within this range 307, the valve may be considered closed or having a closed status. The range 307 includes a nominal position 310. The range 307 also includes an upper tolerance 308 and a lower tolerance 312. These tolerances describe positions that a valve may have to still be considered as having a closed status.

The graph 300A includes a waveform 314A. The waveform 314A illustrates an operation of the valve. The waveform 314A shows that the valve is initially opened at portion 316 of the graph 300A. The waveform 314A at portion 318 of the graph 300A shows that the valve is in a transition to a closed status. This portion 318 shows the transient behavior of the valve. Next, the waveform 314A at portion 320 shows that the valve is closed. Thus, the waveform 314A can be considered to show a normal open/closed sequence of a valve.

Hereinafter, for clarity purposes, many of the reference numbers are eliminated from subsequent drawings so as to focus on the portion of interest of the graph. Each subsequent drawing incorporates the ranges, nominal positions, upper tolerances, and lower tolerances as discussed hereinbefore.

Figure 3B:
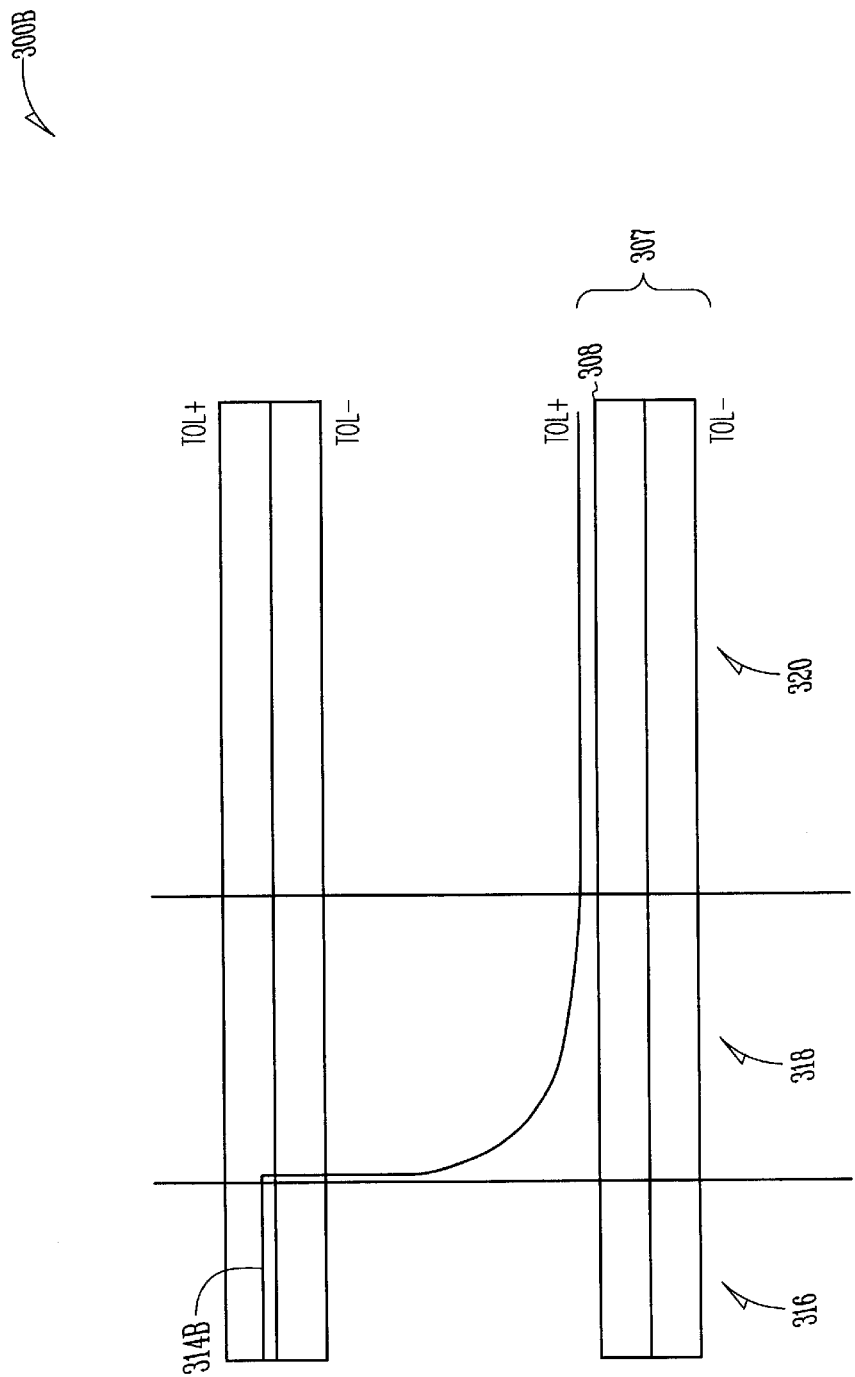

FIG. 3B illustrates an abnormal open/closed sequence of a valve. A graph 300B includes a waveform 314B. The waveform 314B shows that the valve is initially opened at portion 316. At portion 318, the waveform 314B shows that the valve is in a transition from its open status at portion 316 to a closed status. Next, at portion 320, the waveform 314B asymptotically approaches above the upper tolerance 308 of the range 307. This indicates that the valve is not fully closed. This may be caused by some obstructions, such as pulps from orange juice or such. The embodiments of the present invention refrain from adjusting the range 307 in such an abnormal open/closed sequence of the valve.

Figure 3C:
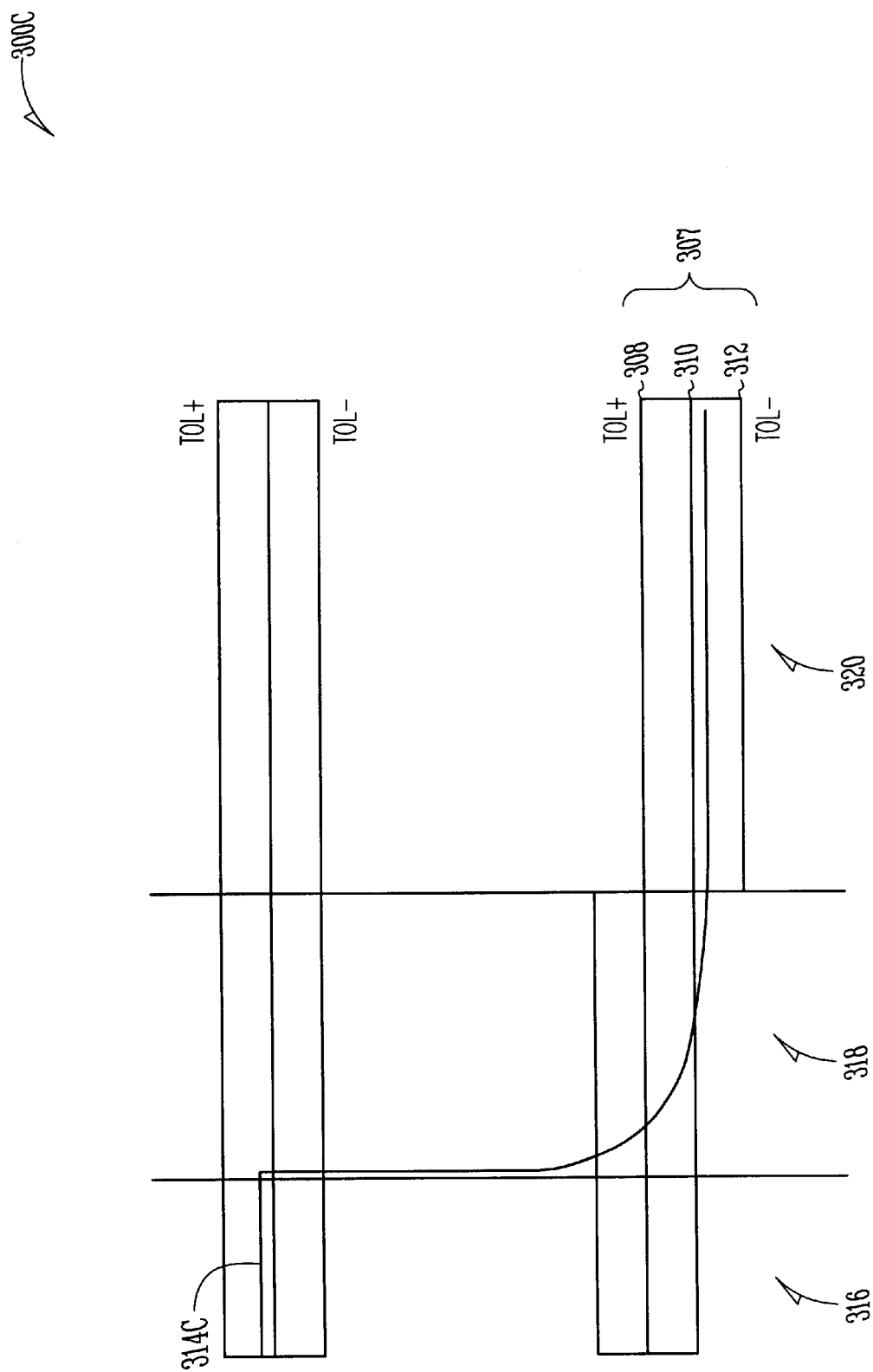

FIG. 3C illustrates an open/closed sequence that is adjusted adaptively by the embodiments of the present invention. A graph 300C includes a waveform 314C. The waveform 314C shows that the valve is initially opened at portion 316. At portion 318, the waveform 314C begins to approach asymptotically below the lower tolerance 312 of the range 307. At portion 320, the embodiments of the invention adjust adaptively the range 307 to characterize the valve as having a closed status even though the waveform 314C is below the original lower tolerance 312. In one embodiment, the nominal position 310 is adjusted; the upper tolerance 308 and the lower tolerance 312 are automatically adjusted with the adjustment of the nominal position 310 because these tolerances are relative with respect to the nominal position 310.

The embodiments of the present invention provide such an adjustment so as to account for the gradual wear in the seat material of the valve. As the seat material is worn, the valve may situate lower and closer to the orifice of the passageway. Thus, the adjustment allows an appropriate characterization of the open/closed status of the valve because the seat material may still function to support the desired joint, albeit worn. At a certain point, the embodiments of the present invention will continue to adjust but will also alert an operator for valve maintenance. At another point beyond that, the embodiments of the present invention will refrain from further adjustment, cease valve operations, and inform the operator.

FIG. 3D illustrates a normal open/closed sequence of a valve. The graph 300D includes a waveform 314D. The waveform 314D shows that the valve is initially closed at portion 316. The waveform 314D at portion 318 of the graph 300D shows that the valve is in a transition to an open status. Next, the waveform 314D at portion 320 shows that the valve is opened. Thus, the waveform 314D can be considered to show a normal open/closed sequence of a valve.

FIG. 3E illustrates an abnormal open/closed sequence of a valve. A graph 300E includes a waveform 314E. The waveform 314E shows that the valve is initially closed at portion 316. At portion 318, the waveform 314E shows that the valve is in a transition from its closed status at portion 316. Next, at portion 320, the waveform 314E asymptotically approaches below the lower tolerance 306 of the range 301. This indicates that the valve is not fully opened. This may be caused by some mechanical failure, such as a jam. The embodiments of the present invention refrain from adjusting the range 301 in such an abnormal open/closed sequence of the valve.

Figure 3F:
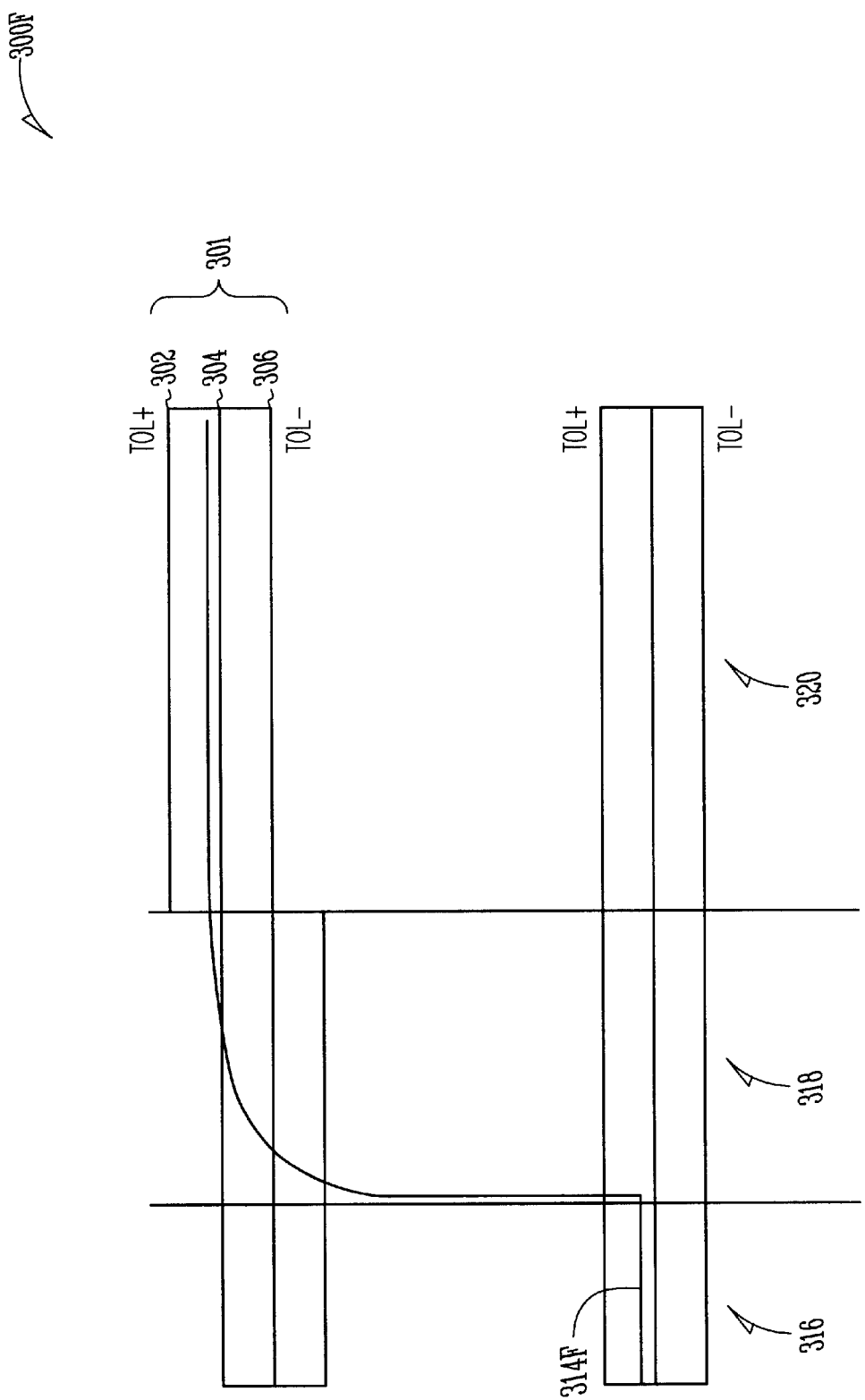

FIG. 3F illustrates an open/closed sequence that is adjusted adaptively by the embodiments of the present invention. A graph 300F includes a waveform 314F. The waveform 314F shows that the valve is initially closed at portion 316. At portion 318, the waveform 314C begins to approach asymptotically above the upper tolerance 312 of the range 301. At portion 320, the embodiments of the invention adjust adaptively the range 301 to characterize the valve as having an open status even though the waveform 314F is above the original upper tolerance 302. In one embodiment, the nominal position 304 is adjusted; the upper tolerance 302 and the lower tolerance 306 are automatically adjusted with the adjustment of the nominal position 304 because these tolerances are relative with respect to the nominal position 304.

Figure 4:
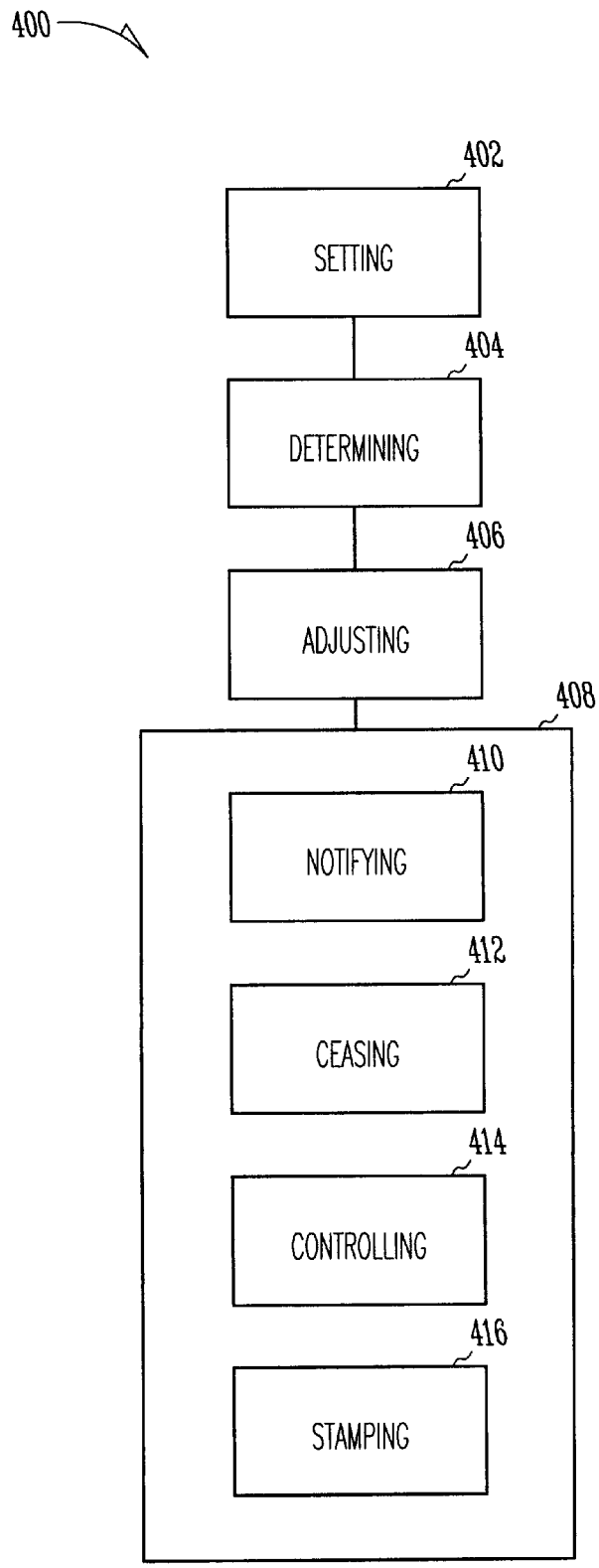
FIG. 4 shows a process diagram for a method according to one aspect of the present invention.

FIG. 4 shows a process diagram for a method according to one aspect of the present invention. The process 400 is a method for monitoring wear in seat materials of a valve. The process 400 includes an act 402 for setting a range of positions that is indicative of an open/closed status of the valve. The act for setting sets a range of positions. The range includes a nominal position and a tolerance. The tolerance includes an upper tolerance and a lower tolerance. The act for setting sets a desired range that includes a first range of positions that indicates that the valve is opened and a second range of positions that indicates that the valve is closed. The act for setting includes storing the range in a memory.

The process 400 includes an act 404 for determining the open/closed status of the valve within the range of positions. In one embodiment, the range is a desired range. The first range includes a first tolerance having an upper tolerance and a lower tolerance. The second range also includes an upper tolerance and a lower tolerance.

The process 400 includes an act 406 for adjusting adaptively the range so as to characterize the valve as having the open/closed status if the valve was not within the range. In one embodiment, the range is adjusted within a desired limit. In one embodiment, the act for adjusting is not executed if the valve is within an undesired range. The undesired range includes a position that is below the lower tolerance of the first range and above the upper tolerance of the second range. In one embodiment, the act for adjusting is not executed if the desired range exceeds the desired limit. The act for adjusting adjusts at least one of the nominal position of the first range and the nominal position of the second range.

The process 400 includes an act for iterating the act for adjusting. Each iteration of adjusting is indicative of wear in seat materials of the valve.

The process 400 includes other acts 408. These acts may be used alone or in combination with the others. One of these acts includes an act 410 for notifying if the range exceeds the desired limit. In one embodiment, the act for notifying notifies an operator for valve maintenance. In another embodiment, the act for notifying includes notifying an operator when the act 412 for ceasing is executed. The act for ceasing ceases valve operations if the range is within an undesired limit. In another embodiment, the act for adjusting includes counting to form a count each time the act for adjusting is iterated; the act for notifying is executed when the count exceeds a desired count.

Other acts 408 include an act 414 for controlling selectively the act for adjusting. The act for controlling is selected from a group consisting of enabling the act for adjusting and disabling the act for adjusting. In one embodiment, the act for controlling allows an act for adjusting to execute when the open/closed status of the valve is a closed status. In another embodiment, the act for controlling allows an act for adjusting to execute when the open/closed status of the valve is an open status. In another embodiment, the act for controlling allows the act for adjusting to execute when the open/closed status of the valve is either a closed status or an open status.

Other acts 408 include an act 416 for stamping the time to form a time stamp at each iteration of adjusting. The act for stamping further includes an act for compiling every time stamp so as to form a history of wear in seat materials of the valve. This is advantageous over current techniques because a history is produced only when desired. The act for stamping further includes an act for graphing every time stamp to form a graph so as to enable an analysis of wear in seat materials of the valve. The act for stamping further includes an act for undoing each iteration of adjusting so as to obtain back the range prior to executing the act for adjusting.

Figure 5:
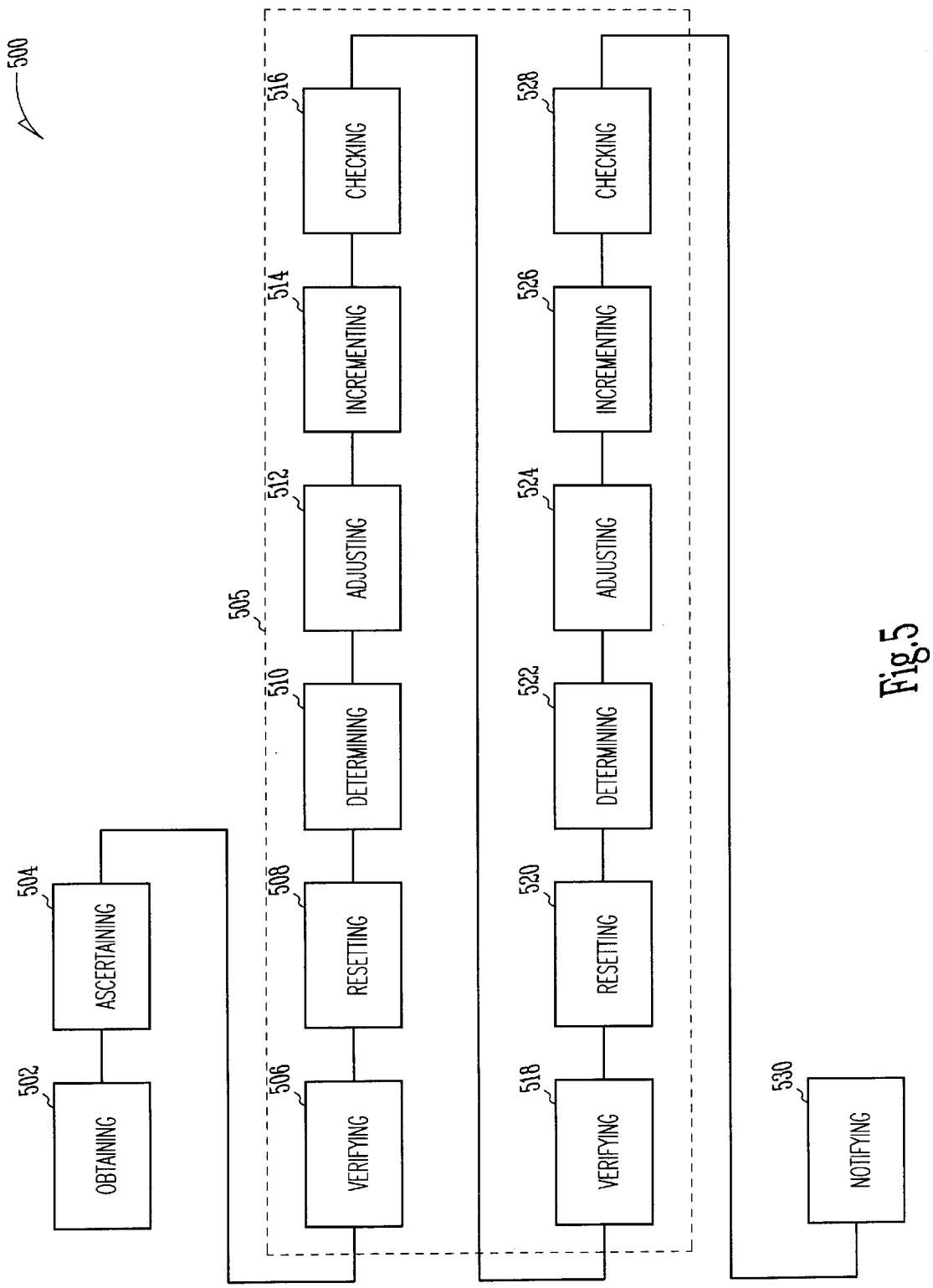
FIG. 5 shows a process diagram for a method according to one aspect of the present invention.

FIG. 5 shows a process diagram for a method according to one aspect of the present invention. The process 500 is a method for monitoring wear in seat materials of a valve. The process 500 includes an act 502 for obtaining a position of the valve. The act for obtaining includes an act 504 for ascertaining if the position is a valid position.

The process 500 includes an act 505 for processing the position that includes adjusting within a range. The act for processing includes an act 506 for verifying. The act 506 for verifying verifies if the position is an open position. The act 506 for verifying verifies if the open position is enabled so as to allow processing of the position. The act 506 for verifying verifies if the open position is defined. The act 506 for verifying verifies if the position is in an alarmed mode.

The act for processing includes an act 508 for resetting selected variables associated with the open position. The act for processing includes an act 510 for determining if the position is within a desired range of the open position. The desired range includes a nominal open position and a tolerance. The act for processing includes an act 512 for adjusting the nominal open position so as to characterize the position as an open position. The act for processing includes an act 514 for incrementing a count that is indicative of wear in seat materials of the valve. The act for processing includes an act 516 for checking if the count exceeds an alert level so as to execute an act 530 for notifying. The act 516 for checking also checks if the count exceeds an alarm level so as to execute the act 530 for notifying.

The act for processing includes an act 518 for verifying. The act 518 for verifying verifies if the position is a closed position. The act 518 for verifying verifies if the closed position is enabled so as to allow processing of the position. The act 518 for verifying verifies if the closed position is defined. The act 518 for verifying verifies if the position is in an alarmed mode.

The act for processing includes an act 520 for resetting selected variables associated with the closed position. The act for processing includes an act 522 for determining if the position is within a desired range of the closed position. The desired range includes a nominal closed position and a tolerance. The act for processing includes an act 524 for adjusting the nominal open position so as to characterize the position as a closed position. The act for processing includes an act 526 for incrementing a count that is indicative of wear in seat materials of the valve. The act for processing includes an act 528 for checking if the count exceeds an alert level so as to execute an act 530 for notifying. The act 528 for checking also checks if the count exceeds an alarm level so as to execute the act 530 for notifying.

The process 500 includes the act 530 for notifying. The act 530 for notifying notifies an operator the wear in seat materials of the valve. The act 530 for notifying may notify at two points in time. At the first point, the act 530 for notifying alerts the operator regarding the maintenance of the seat materials, but the seat materials are still functional. At the second point, the act 530 for notifying alarms the operator regarding the replacement of the seat materials because the seat materials are no longer functional. The act 530 for notifying may also cease valve operations at the second point.

The adjustment as discussed hereinbefore is performed, in one embodiment, in millimeter increments. A maximum count (an alarm level) for adjustment can be predetermined as part of a package for a particular industry, such as dairy or nuclear energy. In one embodiment, when two-thirds of the maximum (an alert level) count is exceeded, the operator will be notified to provide valve maintenance. In another embodiment, when the maximum count is reached, valve operations will cease, and the operator will be notified.

In one embodiment, the range of tolerance around a nominal position that can be set is plus/minus 5 millimeters to zero. The upper tolerance can be set independently of and differently from the lower tolerance. Correspondingly, the lower tolerance can be set independently of and differently from the upper tolerance.

CONCLUSION

Systems and methods have been discussed to monitor wear in seat materials of valves. Seat materials of valves will typically wear with repeated usage. The embodiments of the present invention track such wear and notify operator at desired points regarding the maintenance of such seat materials. The embodiments of the present invention can be used in single-acting valves, double-acting valves, or other valve configurations. One of the benefits of the invention includes the usage of very compact memory resources, which include RAM, ROM, EEPROM, and Flash. Another benefit includes simple field installation.

Although the specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

I claim:

1. A system for monitoring wear in seat materials of a valve, comprising:
   sensors to sense open/closed status of the valve within a desired range; and
   a set of counters to count each time the desired range is adjusted to characterize the valve as having the open/closed status if the valve was not within the desired range, wherein the count of a counter is indicative of wear in seat materials of the valve.

2. The system of claim 1, further comprising a magnetic source coupled to an actuator that is coupled to the valve, wherein the magnet source radiates a magnetic field that is detected by the sensors so as to sense open/closed status of the valve.

3. The system of claim 1, further comprising a microprocessor executing software, wherein the software includes the set of counters, at least one alert level, and at least one alarm level.

4. The system of claim 3, wherein the software issues an alert signal when the count reaches the alert level, and wherein the software issues an alarm signal when the count reaches the alarm level.

5. The system of claim 1, wherein the valve is selected from a group consisting of a single acting valve and a double acting valve.

6. A system for monitoring wear in seat materials of a valve, comprising:
   a magnetic source radiating a field that indicates a position of the valve;
   sensors to sense open/closed status of the valve within a desired range; and
   a set of counters to count each time the desired range is adjusted within a desired limit to characterize the valve as having the open/closed status if the valve was not within the desired range, wherein the count of a counter is indicative of wear in seat materials of the valve.

7. The system of claim 6, further comprising a microprocessor executing software, wherein the software includes the set of counters, wherein the set of counters includes a counter for an open position and a counter for a closed position, wherein the counter for an open position includes an alert level and an alarm level, wherein the counter for a closed position includes an alert level and an alarm level.

8. The system of claim 7, further comprising a setup manager, wherein the setup manager manages an alteration in the alert levels and the alarm levels.

9. The system of claim 8, wherein the setup manager selectively locks the alert levels and the alarm levels to inhibit undesired changes to the alert levels and the alarm levels.

10. The system of claim 9, further comprising a remote control to control the system.

11. A method for monitoring wear in seat materials of a valve, comprising:
   determining an open/closed status of the valve within a desired range; and
   adjusting adaptively the desired range so as to characterize the valve as having the open/closed status if the valve was not within the desired range, wherein each iteration of adjusting is indicative of wear in seat materials of the valve.

12. The method of claim 11, wherein the desired range includes a first range and a second range, wherein the first range includes a first tolerance having an upper tolerance and a lower tolerance, wherein the second range includes a second tolerance having an upper tolerance and a lower tolerance.

13. The method of claim 12, wherein the act for adjusting is not executed if the valve is within an undesired range.

14. The method of claim 13, wherein the undesired range includes a position that is below the lower tolerance of the first range and above the upper tolerance of the second range.

15. The method of claim 11, wherein the act for adjusting is not executed if the desired range exceeds a desired limit.

16. A method for monitoring wear in seat materials of a valve, comprising:
   setting a range of positions indicative of an open/closed status of the valve;
   determining the open/closed status of the valve within the range; and
   adjusting adaptively the range within a desired limit so as to characterize the valve as having the open/closed status if the valve was not within the range, wherein each iteration of adjusting is indicative of wear in seat materials of the valve.

17. The method of claim 16, wherein setting includes setting a range of positions, wherein the range includes a nominal position and a tolerance.

18. The method of claim 17, wherein setting includes setting a range of positions, wherein the tolerance includes an upper tolerance and a lower tolerance.

19. The method of claim 16, wherein setting includes setting a desired range that includes a first range of positions that indicates that the valve is opened and a second range of positions that indicates that the valve is closed.

20. The method of claim 17, wherein setting includes storing the range in a memory.

21. A method for monitoring wear in seat materials of a valve, comprising:
   setting a range of positions indicative of an open/closed status of the valve wherein setting includes setting a range that includes a first range of positions that indicates that the valve is opened and a second range of positions that indicates that the valve is closed;
   determining the open/closed status of the valve within the range;
   adjusting adaptively the range within a desired limit; and
   notifying if the range exceeds the desired limit.

22. The method of claim 21, wherein the first range includes a nominal position having an upper tolerance and a lower tolerance, wherein the second range includes a nominal position having an upper tolerance and a lower tolerance.

23. The method of claim 22, wherein adjusting includes adjusting at least one of the nominal position of the first range and the nominal position of the second range.

24. The method of claim 21, further comprising iterating the act for adjusting, wherein each iteration of adjusting is indicative of wear in seat materials of the valve.

25. of positions indicative of an open/closed status of the valve;
   determining the open/closed status of the valve within the desired range;
   adjusting adaptively the range within a desired limit;
   notifying if the range exceeds the desired limit; and
   ceasing valve operations if the range is within an undesired limit.

26. The method of claim 25, wherein the method does not proceed in the order presented.

27. The method of claim 26, wherein notifying includes notifying an operator for valve maintenance.

28. The method of claim 26, wherein notifying includes notifying an operator when the act for ceasing is executed.

29. The method of claim 25, wherein adjusting includes counting to form a count each time the act for adjusting is iterated, wherein the act for notifying is executed when the count exceeds a desired count.

30. A method for monitoring wear in seat materials of a valve, comprising:
   setting a range of positions indicative of an open/closed status of the valve;
   determining the open/closed status of the valve within the range;
   adjusting adaptively the range within a desired limit; and
   controlling selectively the act for adjusting.

31. The method of claim 30, wherein the act for controlling is selected from a group consisting of enabling the act for adjusting and disabling the act for adjusting.

32. The method of claim 30, wherein controlling includes allowing the act for adjusting to execute when the open/closed status of the valve is a closed status.

33. The method of claim 30, wherein controlling includes allowing the act for adjusting to execute when the open/closed status of the valve is an opened status.

34. The method of claim 30, wherein controlling includes allowing the act for adjusting to execute when the open/closed status of the valve is either closed or opened.

35. A method for monitoring wear in seat materials of a valve, comprising:
   setting a range of positions indicative of an open/closed status of the valve;
   determining the open/closed status of the valve within the range;
   adjusting adaptively the range within a desired limit; and
   stamping the time to form a time stamp at each iteration of adjusting.

36. The method of claim 35, further comprising compiling every time stamp so as to form a history of wear in seat materials of the valve.

37. The method of claim 35, further comprising graphing every time stamp to form a graph so as to enable an analysis of wear in seat materials of the valve.

38. The method of claim 35, further comprising undoing each iteration of adjusting so as to obtain back the range prior to executing the act for adjusting.

39. The method of claim 35, wherein adjusting includes incrementing a count.

40. A method for monitoring wear in seat materials of a valve, comprising:
   obtaining a position of the valve;
   processing the position that includes adjusting within a range, wherein the processing includes verifying if the position is an open position, wherein verifying includes verifying if the open position is enabled so as to allow processing of the position; and notifying an operator the wear in seat materials of the valve.

41. The method of claim 40, wherein obtaining includes ascertaining if the position is a valid position.

42. The method of claim 40, wherein verifying includes verifying if the open position is defined.

43. The method of claim 42, wherein verifying includes verifying if the open position is in an alarmed mode.

44. The method of claim 43, wherein processing includes resetting selected variables associated with the open position.

45. The method of claim 44, wherein processing includes determining if the position is within a desired range of the open position, wherein the desired range includes a nominal open position and a tolerance.

46. The method of claim 45, wherein processing includes adjusting the nominal open position so as to characterize the position as an open position.

47. The method of claim 46, wherein processing includes incrementing a count that is indicative of wear in seat materials of the valve.

48. The method of claim 47, wherein processing includes checking if the count exceeds an alert level so as to execute the act for notifying.

49. The method of claim 48, wherein processing includes checking if the count exceeds an alarm level so as to execute the act for notifying.

50. The method of claim 40, wherein processing includes verifying if the position is a closed position, wherein verifying includes verifying if the closed position is enabled so as to allow processing of the position.

51. The method of claim 50, wherein verifying includes verifying if the closed position is defined.

52. The method of claim 51, wherein verifying includes verifying if the closed position is in an alarmed mode.

53. The method of claim 52, wherein processing includes resetting selected variables associated with the closed position.

54. The method of claim 53, wherein processing includes determining if the position is within a desired range of the closed position, wherein the desired range includes a nominal closed position and a tolerance.

55. The method of claim 54, wherein processing includes adjusting the nominal closed position so as to characterize the position as a closed position.

56. The method of claim 55, wherein processing includes incrementing a count that is indicative of wear in seat materials of the valve.

57. The method of claim 56, wherein processing includes checking if the count exceeds an alert level so as to execute the act for notifying.

58. The method of claim 57, wherein processing includes checking if the count exceeds an alarm level so as to execute the act for notifying.

* * * * *